(12) United States Patent
Hayashi et al.

(10) Patent No.: US 6,910,138 B2
(45) Date of Patent: Jun. 21, 2005

(54) SYSTEM COMPRISING A DETERMINING UNIT THAT DETERMINES WHETHER A POWER SUPPLY IS FROM A FUEL CELL ASSEMBLY AND A SETTING UNIT FOR SETTING OPERATION MODE AS A FUEL CELL ASSEMBLY

(75) Inventors: Kyoji Hayashi, Hidaka (JP); Nobutaka Nakamura, Hidaka (JP); Naoki Fujiwara, Akiruno (JP); Fumitaka Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 597 days.

(21) Appl. No.: 09/905,971

(22) Filed: Jul. 17, 2001

(65) Prior Publication Data

US 2002/0026594 A1 Feb. 28, 2002

(30) Foreign Application Priority Data

Jul. 17, 2000 (JP) .................................. 2000-216271

(51) Int. Cl.⁷ ............................ G06F 1/26; G06F 11/00
(52) U.S. Cl. ........................ 713/300; 713/320; 714/22
(58) Field of Search .......................... 713/300, 320, 713/330, 340, 1, 324; 714/14, 22; 700/286

(56) References Cited

U.S. PATENT DOCUMENTS

| 5,511,205 | A | | 4/1996 | Kannan et al. |
| 5,557,738 | A | * | 9/1996 | Townsley et al. ............. 714/14 |
| 5,760,636 | A | * | 6/1998 | Noble et al. ................. 327/513 |
| 5,976,725 | A | * | 11/1999 | Gamo et al. .................. 429/25 |
| 6,057,051 | A | | 5/2000 | Uchida et al. |
| 6,259,971 | B1 | * | 7/2001 | Mitchell et al. ............. 700/286 |
| 6,711,692 | B1 | * | 3/2004 | Maeda et al. ................ 713/324 |

FOREIGN PATENT DOCUMENTS

| CN | 1231736 A | | 10/1999 | |
| GB | 2241394 A | * | 8/1991 | ............. H02J/7/00 |
| JP | 62-053719 | | 4/1987 | |
| JP | 04-351424 | | 12/1992 | |
| JP | 08286983 A | * | 11/1996 | ........... G06F/12/16 |
| JP | 09-160680 | | 6/1997 | |
| JP | 9-213359 | | 8/1997 | |
| JP | 2000-106201 | | 4/2000 | |
| JP | 2001-356843 | | 12/2001 | |
| TW | 281808 | | 7/1996 | |
| TW | 310483 | | 7/1997 | |
| TW | 347598 | | 12/1998 | |
| TW | 351863 | | 2/1999 | |
| TW | 367630 | | 8/1999 | |

OTHER PUBLICATIONS

Mike Phat, Fuel Cell Update, Jan. 22, 2000, Newsgroup: misc.survivalism, pp. 2.*
Jack McCarthy, Motorola develops fuel cell for electronic devices, Jan. 19, 2000, InfoWorld, p. 1.*
Copy of U.S. Appl. No. 09/523,178 filed Mar. 10, 2000, to Tomimatsu et al.

* cited by examiner

Primary Examiner—Rehana Perveen
Assistant Examiner—Suresh Suryawanshi
(74) Attorney, Agent, or Firm—Finnegan, Henderson, Farabow, Garrett & Dunner, L.L.P.

(57) ABSTRACT

A computer system of this invention includes a power input terminal which is provided outside a personal computer, and an external fuel cell assembly connected to the power input terminal. Hence, a computer system in which water produced from the fuel cell assembly is prevented from entering the computer can be provided. A personal computer for which an operation mode for deriving the personal computer by a fuel cell assembly is prepared to prevent any trouble due to user's misunderstanding can be provided.

20 Claims, 6 Drawing Sheets

SYSTEM COMPRISING A DETERMINING UNIT THAT DETERMINES WHETHER A POWER SUPPLY IS FROM A FUEL CELL ASSEMBLY AND A SETTING UNIT FOR SETTING OPERATION MODE AS A FUEL CELL ASSEMBLY

CROSS-REFERENCE TO RELATED APPLICATIONS

This application is based upon and claims the benefit of priority from the prior Japanese Patent Application No. 2000-216271, filed Jul. 17, 2000, the entire contents of which are incorporated herein by reference.

BACKGROUND OF THE INVENTION

1. Field of the Invention

The present invention relate to a computer system using a fuel cell assembly as a power supply and, more particularly, to a personal computer using a fuel cell assembly of type which directly oxidizes methanol.

2. Description of the Related Art

Various personal computers using a fuel cell assembly have been devised. In a conventional personal computer using a fuel cell assembly, the fuel cell assembly is set in the personal computer main body.

Such a personal computer is disclosed in, e.g., Jpn. Pat. Appln. KOKAI Publication No. 9-213359. The fuel cell assembly disclosed in Jpn. Pat. Appln. KOKAI Publication No. 9-213359 uses a hydrogen-absorbing metal.

A fuel cell assembly inevitably produces water. This water is normally vaporized using heat generated in the computer. In some cases, however, the vapor liquefies in the housing of the personal computer under various environmental conditions. A design for preventing the water from entering the personal computer conflicts required conditions for heat dissipation, ventilation, and the like.

That is, in the conventional personal computer, the fuel cell assembly is set in the personal computer, and when water produced from the fuel cell assembly enters the personal computer, the personal computer malfunctions.

In addition to a fuel cell assembly with a hydrogen storage unit using a hydrogen-absorbing alloy, a DMFC (Direct Method Fuel Cell) has been devised. Such a DMFC is disclosed in, e.g., Japanese Patent Application No. 10-278759 filed by the present applicant. The DMFC does not require so-called auxiliary equipment for pumping fuel and hence has no movable mechanical portion. For this reason, the DMFC is readily made compact and lightweight and therefore is suitable as a power supply of a notebook personal computer.

If, however, a DMFC is designed not to have a stacked cell structure so as to manufacture the cell at a low cost, air supplied to the cell relies on diffusion and convection. As a consequence, to supply power required for a current notebook PC, the DMFC has an excessively large area. Even if the performance of a DMFC improves to, for example, 45 mW/cm$^2$, the cell needs to have an area of 1,000 cm$^2$ to supply 45 W.

The biggest merit in using a fuel cell assembly for a portable apparatus is that the apparatus can be used substantially unlimited time period in the AC power less embodiment, as long as a fuel is carried. When the fuel cell assembly is used, it is required to restrict a performance and function of the personal computer.

While being out as long as a fuel is carried. However, the power that can be extracted from the fuel cell assembly is limited. If a high priority is to be given to the long-term use of a personal computer even at the expense of performance, the personal computer needs to be operated with a great restriction on power consumption. However, present notebook PCs are not designed to operate on the power that can be extracted from a fuel cell assembly.

Many current notebook personal computers are designed assuming, as a main power supply, an Li ion cell charged using a dedicated AC adapter. In this case, for the viewpoint of efficiency and the like, it is supposed to be optimum to design a secondary cell with a terminal voltage of about 10V by connecting three cells in series in a battery pack.

The cell output voltage of a fuel cell assembly is about 0.5V in operation. A fuel cell assembly having a number of cells stacked (this type is hard to manufacture and be inexpensive) is generally designed to obtain such an output voltage, though it is expensive and difficult to use.

For cost reduction, a personal computer operable by a low-level voltage, which can easily be obtained by segmenting a grid into a plurality of portions in an integrated fuel cell assembly and connecting those portions in series, is necessary.

However, with the low power obtained by such a fuel cell assembly, the conventional computer system cannot normally operate when a power-consuming application is executed.

BRIEF SUMMARY OF THE INVENTION

The present invention has been made in consideration of the above situation, and has as its object to provide a computer system in which water produced from a fuel cell assembly is prevented from entering the computer.

It is another object of the present invention to provide a computer system which can be normally operated even by a low output obtained from a fuel cell assembly.

In order to achieve the above objects, according to the first aspect of the present invention, there is provided a computer system comprising a power input terminal which is provided outside a personal computer, and an external fuel cell assembly connected to the power input terminal.

According to this aspect, by externally connecting the fuel cell assembly to the personal computer, water produced from the fuel cell assembly can be prevented from entering the personal computer to result in malfunction of the personal computer.

According to the second aspect of the present invention, there is provided a personal computer comprising means for determining whether a power supply is a fuel cell assembly on the basis of a received power supply output, means for, when it is determined that the power supply is the fuel cell assembly, switching an operation mode to a fuel cell assembly mode in which the fuel cell assembly is used as the power supply.

According to this aspect, when it is determined that the power supply is the fuel cell assembly, the operation mode of the personal computer is switched to the fuel cell assembly mode in which the fuel cell assembly is used as the power supply. Hence, even when the output level of the fuel cell assembly is low, the personal computer can normally operate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

The embodiments of the present invention will be described below with reference to the accompanying drawing.

<First Embodiment>

Figure 1:
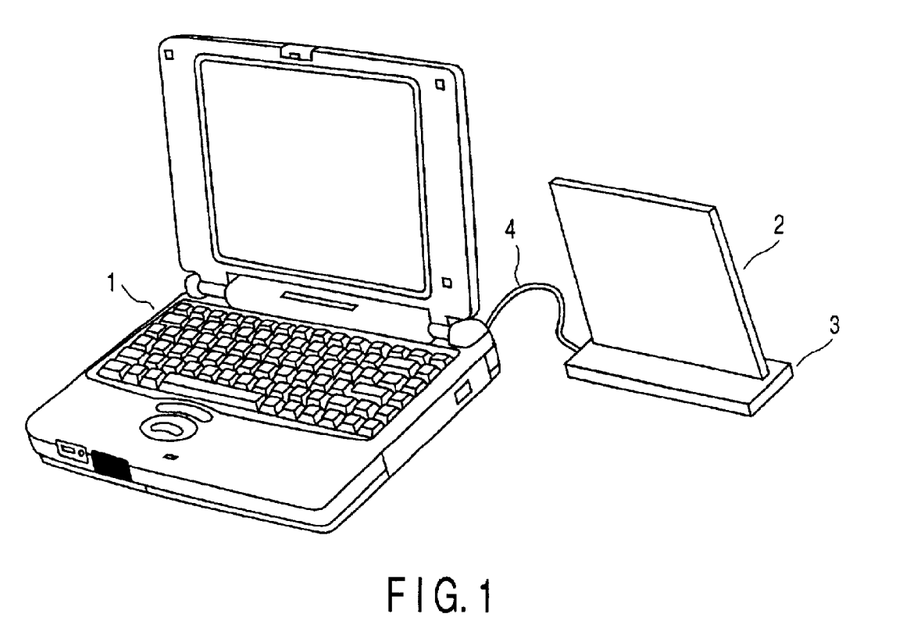
FIG. 1 is a view showing a notebook personal computer system according to the first embodiment of the present invention.

FIG. 1 is a view showing a notebook personal computer system according to the first embodiment of the present invention.

Referring to FIG. 1, reference numeral 1 denotes a notebook personal computer; 2, a fuel cell assembly; 3, a support of the fuel cell assembly 2; and 4, a power supply line for supplying the power from the fuel cell assembly 2 to the notebook personal computer 1.

As shown in FIG. 1, the fuel cell assembly 2 is externally connected to the notebook personal computer 1 through the power supply line 4. With this arrangement, the user can process water as needed in accordance with the environmental conditions for use of the notebook personal computer 1. In addition, since the notebook personal computer 1 need no special measure against water the notebook personal computer 1 itself can be prevented from becoming expensive.

The power supply of the notebook personal computer 1 is not limited to the fuel cell assembly 2. The notebook personal computer 1 can have a large power supply capacity by an internal Li cell and receive power from an AC adapter 5.

In this case, the high-speed/high-level operation using power of several ten W is possible as ever. On the other hand, when the fuel cell assembly 2 is used, the notebook personal computer 1 operates in a dedicated fuel cell assembly mode capable of executing only application programs other than some especially power-consuming application programs by a method to be described below.

Figure 2:
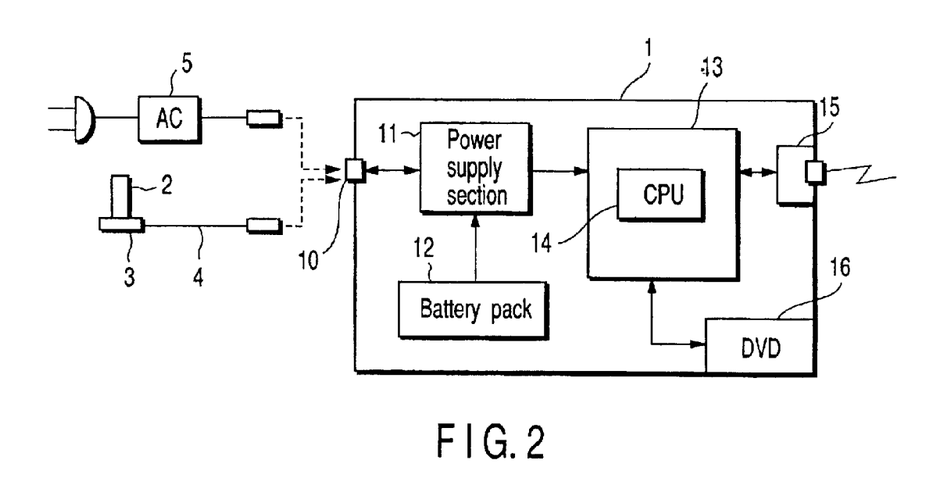
FIG. 2 is a block diagram showing the arrangement of the notebook personal computer.

FIG. 2 is a block diagram showing the arrangement of the notebook personal computer. The same reference numerals as in FIG. 1 denote the same parts in FIG. 2, and a detailed description thereof will be omitted.

As shown in FIG. 2, either the fuel cell assembly 2 or AC adapter 5 can be connected to a power input connector 10 of the notebook personal computer 1. The power input from the power input connector 10 is converted into a voltage appropriate to each part of the notebook personal computer 1 by a power supply section 11 and supplied to each part of the notebook personal computer 1.

The power supply section 11 charges a battery pack 12 or receives power from the battery pack 12.

One of the power supply destinations of the power supply section 11 is a main board 13. The main board 13 has a CPU 14. As examples of peripheral devices connected to the main board 13, a modem 15 and DVD player/recorder 16 are illustrated in FIG. 2.

The CPU 14 controls the entire notebook personal computer 1. The modem 15 communicates with another computer through a communication line. The DVD player/recorder 16 plays back sound and image recorded on a DVD or records sound and image on a DVD.

The power supply section 11 incorporates a DC/DC converter, power supply microcomputer, and cell charge/discharge control IC as ever. Even when the notebook personal computer 1 is kept OFF, the power supply microcomputer is operating by receiving low power so as to monitor such an event that the power switch of the notebook personal computer 1 is turned on, or power is supplied to the power input connector 10, as ever.

One of characteristic features of the notebook personal computer of this embodiment is the operation of the power supply microcomputer of the power supply section 11.

As a characteristic feature of the operation of the power supply microcomputer of the notebook personal computer according to this embodiment, after the power input start event, the input power supply voltage is monitored, and the subsequent operation mode of the notebook personal computer is determined in accordance with the power supply voltage.

Figure 3:
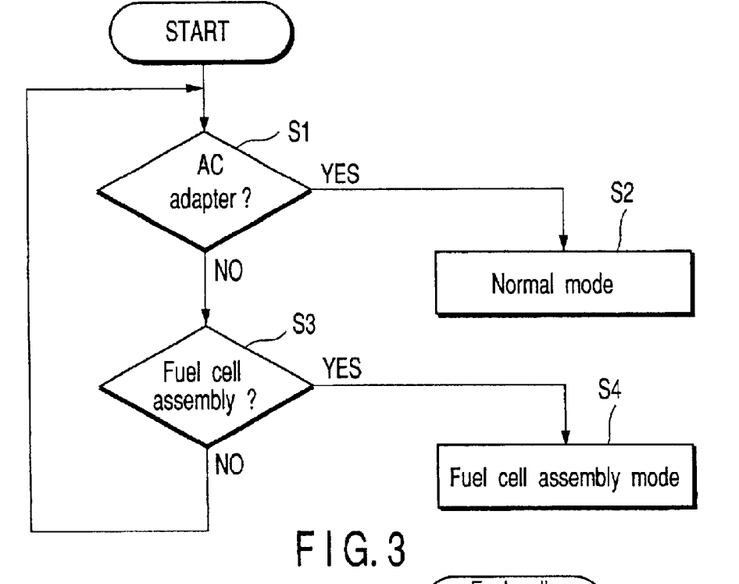
FIG. 3 is a flow chart for explaining the operation of the power supply microcomputer of the notebook personal computer.

The operation of the power supply microcomputer of the notebook personal computer according to this embodiment will be described below with reference to the flow chart shown in FIG. 3.

First, the power supply microcomputer determines whether the AC adapter is connected (S1). If YES in step S1, a normal mode for executing conventional operation is set (S2).

If NO in step S1, it is determined whether the fuel cell assembly is connected (S3). If YES in step S3, the mode shifts to a fuel cell assembly mode (S4).

If NO in step S3, the flow returns to processing in step S1. Whether the AC adapter is connected or whether the fuel cell assembly is connected is determined on the basis of the input power supply voltage.

That is, when the AC adapter is connected, a power of about 15V is input as ever. When the fuel cell assembly 2 is connected, a power of only several V (about 2V as a typical value in operation) is input.

For the former case, the power supply microcomputer sets the normal mode for executing conventional operation. For the latter case, the power supply microcomputer sets the fuel cell assembly mode. Since the operation mode is automatically set in accordance with the type of power supply, any mode setting error by user's operation error can be prevented.

When neither power supplies are connected at the time of activation, the internal cell is used as the main power supply. This case is slightly complex and will be described later in the second embodiment.

The fuel cell assembly mode will be described next in detail.

In the fuel cell assembly mode, the power consumption of the notebook personal computer 1 in operation is reduced such that the notebook personal computer 1 can operate on the basis of the power supplied from the fuel cell assembly 2.

Several methods of reducing power consumption are available. Typical examples will be described. Any other method may be used as far as it can reduce power consumption, or some of the methods to be described below may be combined.

Figures 4, 5, 6:
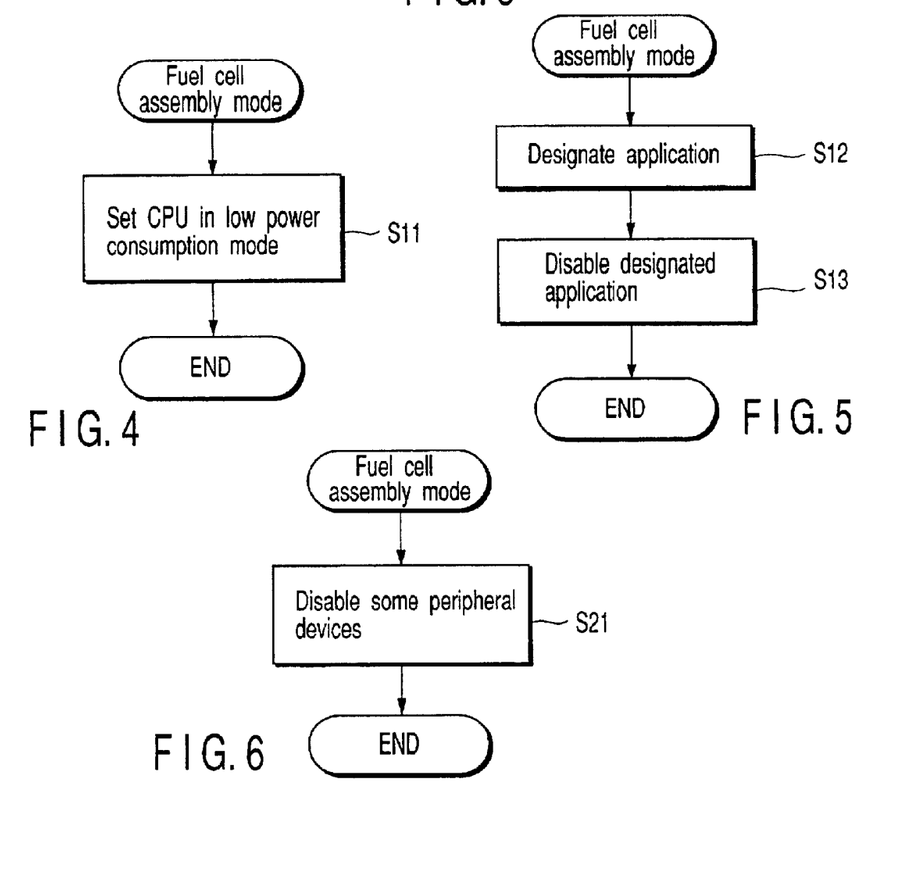
FIG. 4 is a flow chart for explaining the first example of the fuel cell assembly mode.
FIG. 5 is a flow chart for explaining the second example of the fuel cell assembly mode.
FIG. 6 is a flow chart for explaining the third example of the fuel cell assembly mode.

In the first example, when the fuel cell assembly mode is set, the CPU is set in a low power consumption mode (S11), as shown in FIG. 4. Operating the power supply section 11 in the low power consumption mode is a well-known technique, and a detailed description thereof will be omitted here. In this fuel cell assembly mode, since the power consumption must be largely reduced as compared to the normal mode, the low power consumption mode is set in the following way.

Recent CPUs are designed with an emphasis mainly placed on power consumption reduction in high-speed operation, so the power supply voltage of the core in the CPU chip is made as low as possible.

This increases the leakage current of the transistor. In the fuel cell assembly mode wherein the clock speed is considerably reduced, the power supply voltage of the core is made slightly higher than that in the normal mode. Hence, the power consumption can be reduced. Conventionally, the power consumption is reduced by dropping the power supply voltage of the core.

The CPU architecture also preferably has the low power consumption mode. For example, to increase the degree of parallel processing, a recent CPU obtains a result as if a plurality of instructions designated for serial execution on the program were executed in parallel and the results were serially output without any inconsistency. In the fuel cell assembly mode, the power consumption is preferably reduced by a design for simply serially executing commands without supplying the power to a circuit for such parallel processing.

In the second example, applications, which cannot be executed in the fuel cell assembly mode or are inappropriate to execute in the fuel cell assembly mode, are not executed.

More specifically, as shown in FIG. 5, the user designates in advance applications which cannot be executed in the fuel cell assembly mode or are inappropriate to execute in the fuel cell assembly mode (S12).

In this case, the user designates the applications in advance. However, the applications may be automatically detected by software or designated in advance at the time of shipment from a factory. The designated applications are disabled to inhibit the start (S13).

In this embodiment, traditional office applications (e.g., WORD available from Microsoft) and Internet accesses using the modem 15 can operate (moving image or music application cannot operate, as described above). These applications can be practically executed even by a CPU with considerably low performance and are also determined as applications whose needs for long-time use outdoor are high.

In the third example, some peripheral devices are not activated.

More specifically, as shown in FIG. 6, some peripheral devices are disabled (S21). In this embodiment, the DVD player/recorder 16 is not activated in the fuel cell assembly mode. This is because the DVD player/recorder 16 itself requires high power consumption, and a moving image as a main application that uses the DVD player/recorder 16 requires full use of CPU performance and therefore real-time processing cannot be executed by the CPU in the low power consumption mode.

In the fuel cell assembly mode, the battery pack 12 is not charged or discharged (is not used as a power supply). This is because, in the fuel cell assembly mode, the battery pack 12 is unreliable, and the user must properly understand this point. As another reason, inefficient operation of charging the cell by the low voltage of the fuel cell assembly must be prevented.

Switching between the fuel cell assembly mode and the normal mode is done only when the notebook personal computer is kept OFF. This facilitates switching to the low power consumption mode at the CPU architecture level and is also important in preventing operation error by the user.

That is, connection of the fuel cell assembly to the notebook personal computer that is operating in the normal mode is inhibited. In this embodiment, a warning message is displayed in the window, and the operation in the normal mode is continued. With this arrangement, the fuel cell assembly mode can be clearly interpreted, and discrepancy between the user's expectation and the operation of the notebook personal computer 1 can be prevented.

<Second Embodiment>

The second embodiment of the present invention will be described next.

Figure 7:
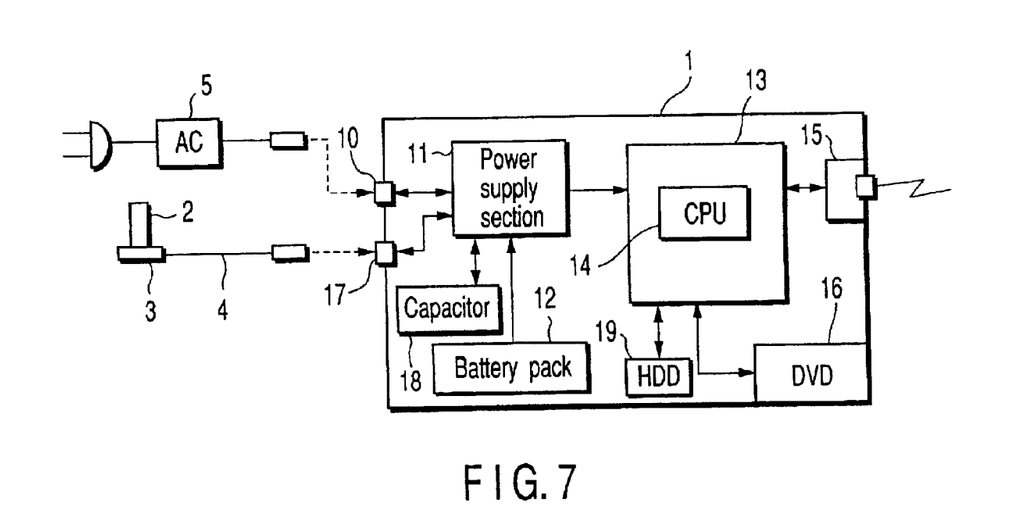
FIG. 7 is a block diagram showing the arrangement of a notebook personal computer according to the second embodiment of the present invention.

FIG. 7 is a block diagram showing the arrangement of a notebook personal computer according to the second embodiment of the present invention. The same reference numerals as in FIG. 2 denote the same parts in FIG. 7, and a detailed description thereof will be omitted. Only different parts will be described here.

As a characteristic feature of this embodiment, a power input connector 17 dedicated to the fuel cell assembly and an electric double-layered capacitor 18 are added.

A power input connector 10 of a notebook personal computer 1 is connected to an AC adapter 5. The notebook personal computer 1 has the power input connector 17 dedicated to the fuel cell assembly and is connected to a fuel cell assembly 2.

Both the AC adapter 5 and fuel cell assembly 2 are connected to a power supply section 11. The power is converted into a voltage appropriate to each part of the notebook personal computer 1 by the power supply section 11 and supplied to each part of the notebook personal computer 1.

The power supply section 11 is connected to a battery pack 12 so as to be able to charge the battery pack 12 or receive power from the battery pack 12 and supply the power to each part of the notebook personal computer 1 as shown, as described above.

One of the power supply destinations of the power supply section 11 is a main board 13 of the notebook personal computer 1. The main board 13 has a CPU 14. As examples of peripheral devices connected to the main board 13, a modem 15, DVD player/recorder 16, and hard disk drive 19 are illustrated in FIG. 7.

The operation of the power supply section in receiving power from the AC adapter 5 or receiving power from the battery pack is basically the same as the conventional operation. The power supply section 11 incorporates a DC/DC converter, power supply microcomputer, and cell charge/discharge control IC as ever. Operation performed when the power is supplied from the fuel cell assembly 2 is largely different from the conventional operation.

That is, the power supply voltage input from the AC adapter is about 15V as a typical value. For the fuel cell assembly of this embodiment, a power of only several V (about 2V as a typical value in operation) is input.

Hence, the dedicated connector 17 is used to connect the fuel cell assembly, and a dedicated DC/DC converter is prepared. The power supply microcomputer operates while clearly distinguishing between a normal mode for the conventional operation and a fuel cell assembly mode wherein the power is supplied from the fuel cell assembly.

While the notebook personal computer 1 is kept OFF, the power supply microcomputer identifies which power supply terminal starts power supply and automatically sets the operation mode. Hence, any mode setting error by user's operation error can be prevented.

Figure 8:
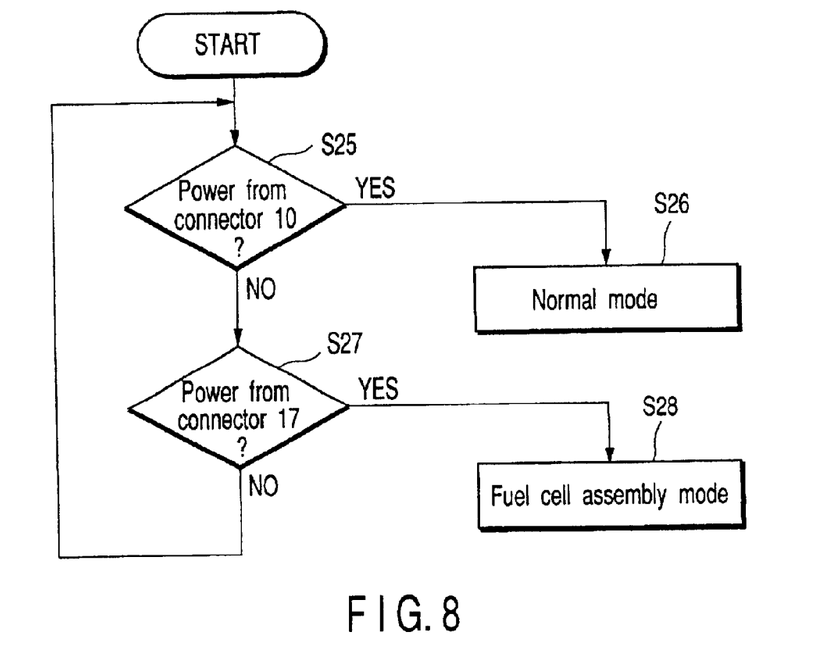
FIG. 8 is a flow chart for explaining the operation of the power supply microcomputer.

More specifically, as shown in FIG. 8, first, it is determined whether power is supplied from the power input connector 10 (S25). If YES in step S25, the mode shifts to the normal mode (S26).

If NO in step S25, it is determined whether the power is supplied from the power input connector 17 dedicated to the fuel cell assembly (S27).

If YES in step S27, the mode shifts to the fuel cell assembly mode (S28). If NO in step S27, the flow returns to processing in step S25.

Detailed processing including a case wherein the internal cell is used as a main power supply will be described later with reference to FIG. 9. The fuel cell assembly mode has been described in the first embodiment, and a repetitive description thereof will be omitted.

Switching between the fuel cell assembly mode and the normal mode is done only when the notebook personal computer 1 is kept OFF. This facilitates switching to the low power consumption mode at the CPU architecture level and is also important in preventing operation error by the user.

That is, connection of the fuel cell assembly to the notebook personal computer that is operating in the normal mode is inhibited. In this embodiment, when the fuel cell assembly is connected to the notebook personal computer that is operating in the normal mode, a warning message is displayed in the window, and the operation in the normal mode is continued.

With this arrangement, the fuel cell assembly mode can be clearly interpreted, and discrepancy between the user's expectation and the operation of the notebook personal computer 1 can be prevented.

Figure 9:
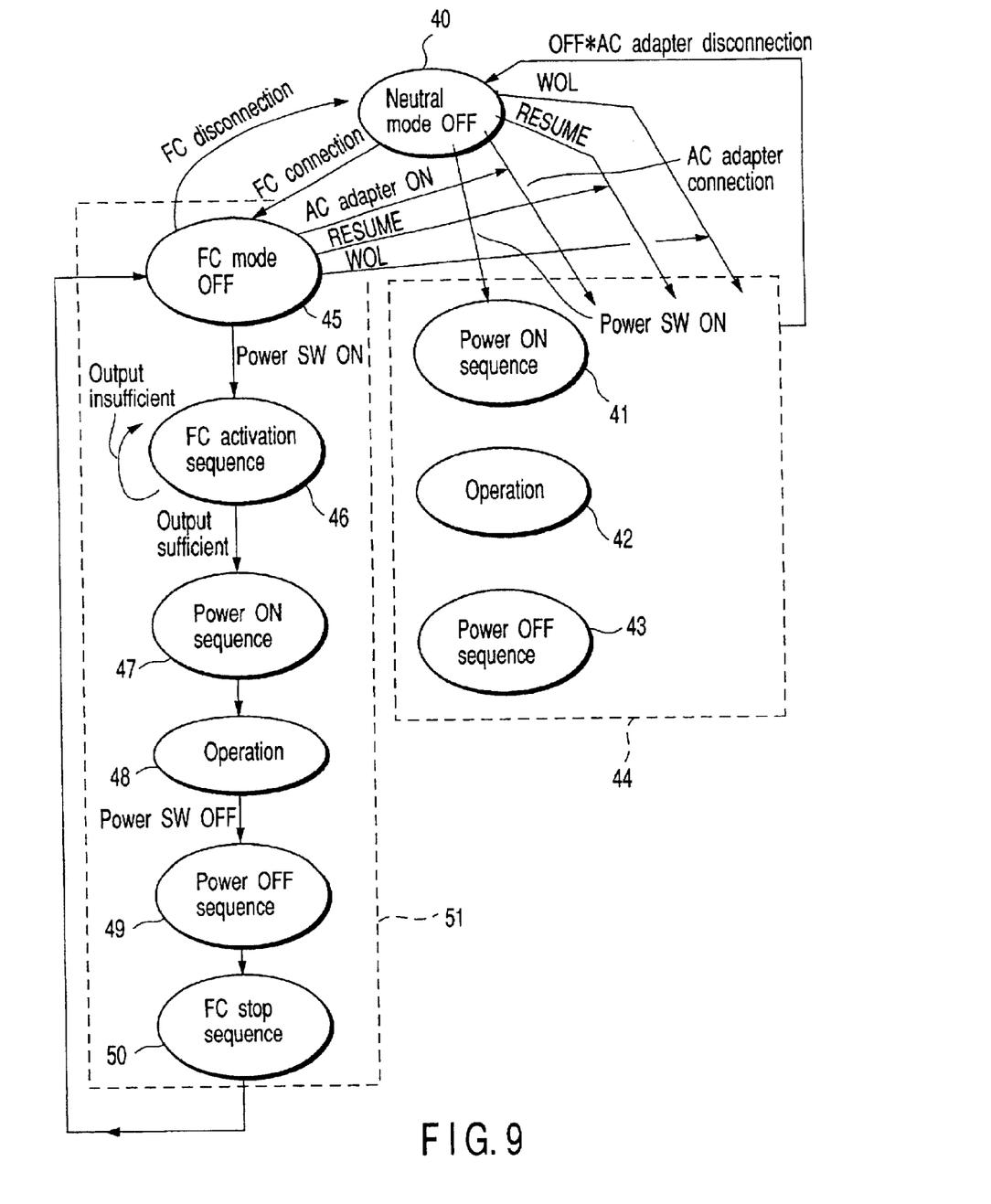
FIG. 9 is a chart for explaining mode switching.

FIG. 9 is a chart for explaining mode switching of the notebook personal computer according to this embodiment. More specifically, this is implemented as the firmware of the power supply microcomputer in this embodiment.

A state 40 is the initial state. The overall power supply control of the conventional notebook personal computer is indicated by a frame 44. In this case, the power ON sequence in a state 41, the operation sequence in a state 42, and the power OFF sequence in a state 43 are shown.

The state 40 is the conventional OFF state. Each processing sequence starts in accordance with an event "power SW is turned on", "AC adapter is connected", "resume condition is satisfied", or "Wake On LAN condition is satisfied".

A series of processes executed when the power switch is turned on are indicated as the states 41 to 43.

The state 40 is the only neutral state in which transit between the fuel cell assembly mode and the normal mode is possible.

When the fuel cell assembly (FC) is connected in this state, the state transits to a fuel cell assembly mode OFF state 45. When the power switch is turned on, the notebook personal computer 1 is activated in the fuel cell assembly mode.

However, unlike the normal mode by Li cell drive, before the power ON sequence of the notebook personal computer 1 starts, a sequence 46 for activating the fuel cell assembly is executed.

The manner the fuel cell assembly is activated largely changes depending on the design of the fuel cell assembly unit. At the start of this sequence, the fuel cell assembly unit is identified.

Figure 10:
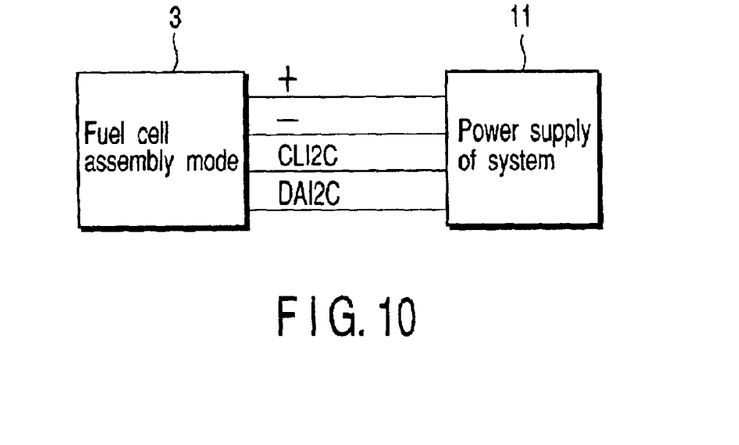
FIG. 10 is a view showing the interface between the fuel cell assembly and the personal computer.

In this embodiment, the power input connector 17 for the fuel cell assembly has connection for $I^2C$ communication, unlike the normal connector 10 for the AC adapter, as shown in FIG. 10.

CLI2C and DAI2C are clock and data lines for the $I^2C$ communication. For this communication, any other scheme except that for the $I^2C$ communication can be used as long as the required number of signal lines is small.

Figure 13:
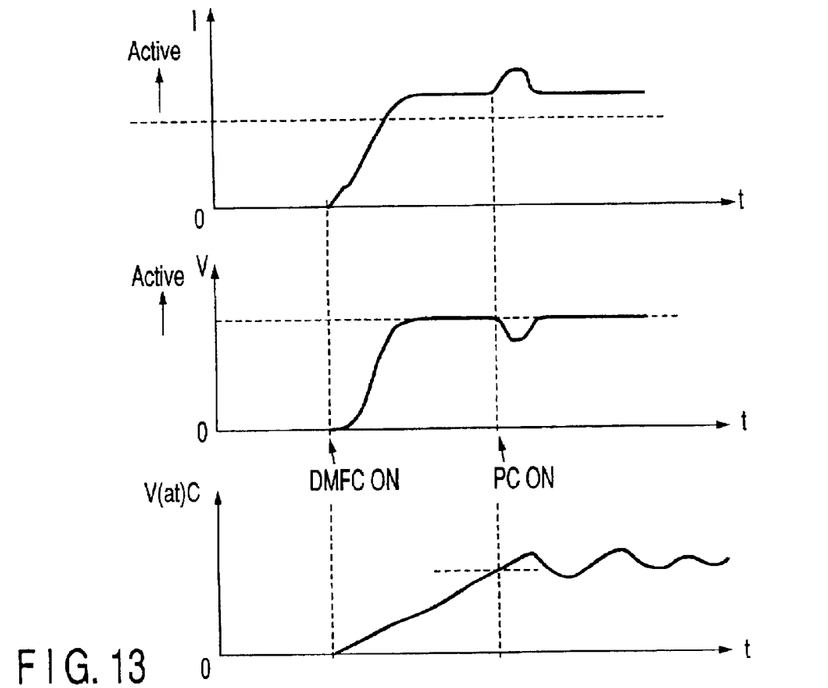
FIG. 13 is a graph showing the output characteristics of the fuel cell assembly of the notebook personal computer of this embodiment.

Basically, only an activation command need be sent from the power supply microcomputer of the notebook personal computer 1 to the fuel cell assembly through the $I^2C$ communication line shown in FIG. 13 as long as the fuel cell assembly unit has various auxiliary functions.

In this case, the fuel cell assembly unit autonomously increases the fuel cell assembly temperature and connects an internal dummy load to the fuel cell assembly to increase the output of the fuel cell assembly to a predetermined value. This is because the load response of a fuel cell assembly is generally very slow.

If the load largely varies, a time of about 1 sec may be required until the current stabilizes. hence, when the notebook personal computer 1 is to be directly activated using the fuel cell assembly in the no load state, no sufficient power is supplied.

For a fuel cell assembly unit of inexpensive type with only basic functions, when the power switch ON event occurs in the fuel cell assembly mode, the power supply microcomputer connects the output of the fuel cell assembly to the electric double-layered capacitor 18 to set the fuel cell assembly in the full load state, and starts the power ON sequence after checking that the output of the fuel cell assembly increases to a predetermined value or more.

Depending on the type of fuel cell assembly and environmental conditions, the cell may have to be preheated by reversely feeding the power from the secondary cell 12 to the fuel unit through the power supply lines (+ and −) shown in FIG. 10 before the power ON sequence.

Figure 11:
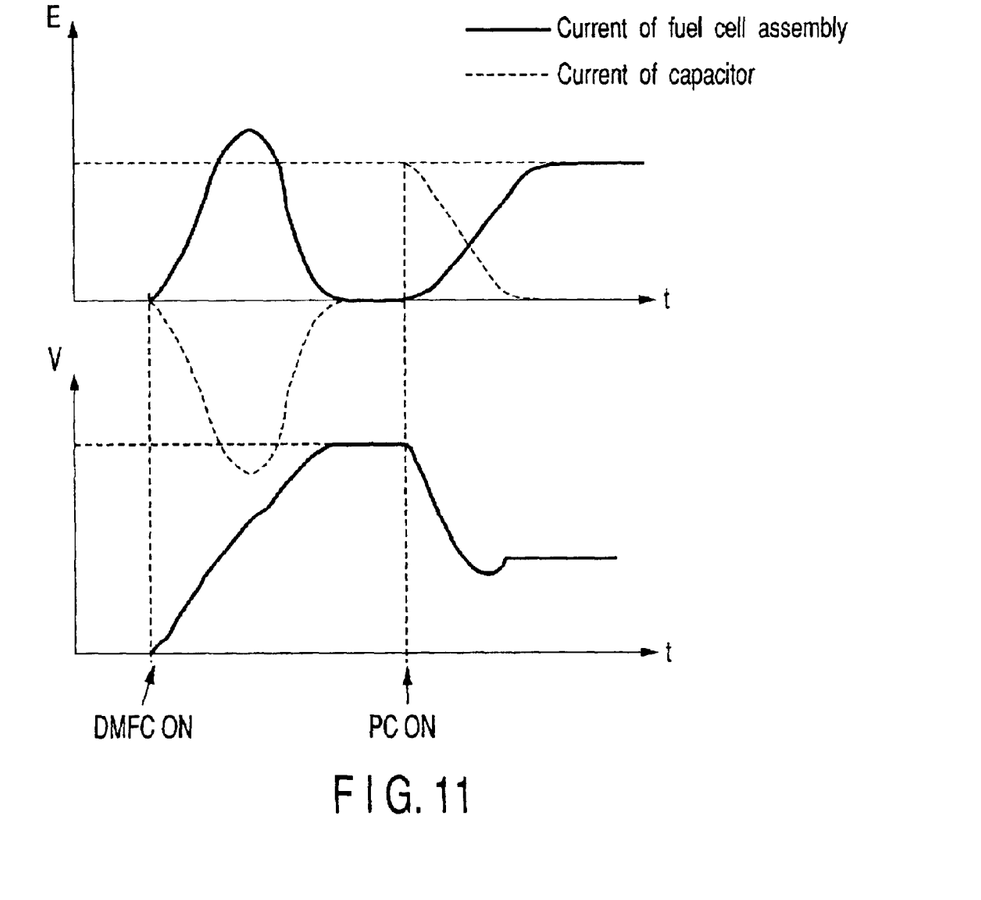
FIG. 11 is a graph showing the output characteristics of the fuel cell assembly when it is assumed that the personal computer is powered on after the output voltage of the fuel cell assembly sufficiently rises.

It is not preferable to directly connect the capacitor to the output line of the fuel cell assembly and start the power ON sequence after the power supply voltage sufficiently rises. This is because after the power supply voltage sufficiently rises, the output current of the fuel cell assembly considerably decreases, as shown in FIG. 11. As is known, until the output current of the fuel cell assembly rises, a very long time is required as compared to other cells.

Figure 12:
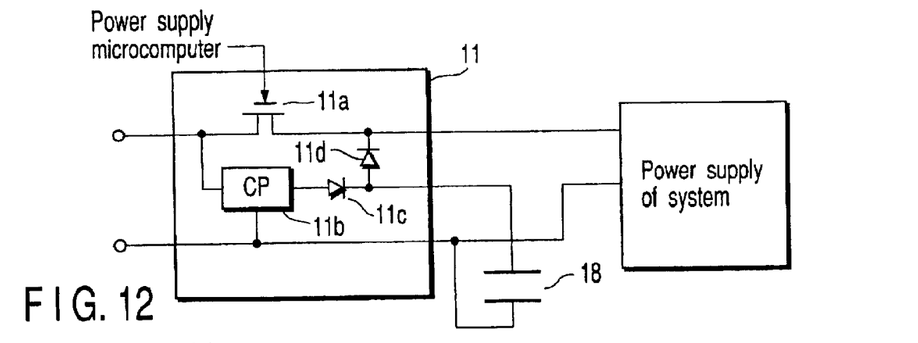
FIG. 12 is a circuit diagram showing the power supply section of the notebook personal computer of this embodiment.

In this embodiment, as shown in FIGS. 12 and 13, the capacitor 18 is actively charged using a charge pump circuit 11b through a diode 11c under the control of the power supply microcomputer. The charge pump circuit 11b has a function of boosting the low-level voltage from the fuel cell assembly 2.

The power supply microcomputer monitors the state of charges in the fuel cell assembly and electric double-layered capacitor 18, and when the fuel cell assembly is set on the operative state, turns on the notebook personal computer and executes a power ON sequence 47 of the notebook personal computer 1.

More specifically, referring to FIG. 12, a control signal is output to a switching transistor 11a to turn on the switching transistor 11a. Simultaneously, the operation of the charge pump circuit 11b is stopped. Thus, the output from the fuel cell assembly is supplied to the notebook personal computer 1.

In the process of activating the notebook personal computer 1, or during the operation of the notebook personal computer 1, the internal hard disk drive 19 is activated. At this time, since the motor of the hard disk drive is activated, a large rush current flows. The electric double-layered capacitor 18 also has a function of preventing such an abrupt variation in load from being directly transmitted to the fuel cell assembly, as shown FIG. 13.

Figure 14:
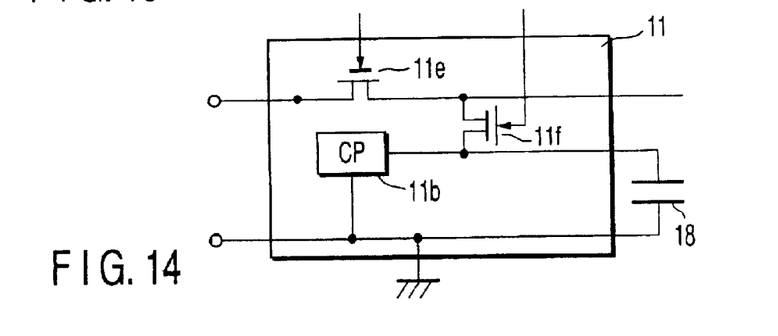
FIG. 14 is a circuit diagram showing another example of the power supply section of the notebook personal computer of this embodiment.

If the influence of some system-side load on the fuel cell assembly 2 is allowable, the power supply section 11 having the arrangement shown in FIG. 14 may be used. In this case, the capacitor 18 is charged by the charge pump circuit 11b, and when the output from the fuel cell assembly 2 and the like reach predetermined values, switching transistors 11e and 11f are turned on.

Referring back to FIG. 9, although the power ON sequence 47 is the same as the conventional power ON sequence 41, the number of components to be powered on is smaller because the power consumption and function are reduced.

The subsequent sequence in the fuel cell assembly mode is almost the same as that in the normal mode, and a detailed description thereof will be omitted. A frame 51 shown in FIG. 9 represents the fuel cell assembly mode. When the notebook personal computer 1 is executing certain operation, mode transit is not allowed.

When the notebook personal computer 1 is powered off and set in the state 45, the mode can be changed. Similarly, in the normal mode, i.e., in the state represented by the frame 44, transit to the fuel cell assembly mode is not allowed.

In the normal mode, the power input terminal 17 from the fuel cell assembly is disconnected by the switch in the power supply section 11. Hence, even when the user connects the fuel cell assembly while the notebook personal computer 1 is being operated by, e.g., cell drive, the fuel cell assembly is actually kept disconnected. After the user powers off a node PC, the notebook personal computer can transit to the fuel cell assembly mode through the neutral mode.

In the state 45 in which the node PC is OFF although the fuel cell assembly is connected, when, e.g., the Wake On LAN condition is satisfied, the notebook personal computer operates as if the condition were satisfied in the neutral mode.

That is, the notebook personal computer 1 is activated using the cell as the power supply, and Wake ON LAN processing is started. Since the normal mode is set at this time, the power from the fuel cell assembly is disconnected from the notebook personal computer 1, as described above.

According to the notebook personal computer system of this embodiment, in addition to the effect of the computer system of the first embodiment, since the capacitor is charged using the fuel cell assembly until the output of the fuel cell assembly stabilizes, the energy loss in the entire system becomes small. In addition, since the capacitor is not directly connected to the system, an excess rush current can be prevented from flowing to the fuel cell assembly.

As has been described above in detail, according to the present invention, a computer system in which water produced from the fuel cell assembly is prevented from entering the computer can be provided. In addition, a computer system which can normally operate using even a fuel cell assembly for which both the output power and output voltage are low can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer capable of being connected to a fuel cell assembly comprising:
    a determining unit which determines whether a power supply is from the fuel cell assembly; and
    a setting unit which sets an operation mode of the computer as a fuel cell assembly mode in which the power supply is from the fuel cell assembly, when the determining unit determines the power supply is from the fuel cell assembly.

2. The computer according to claim 1, further comprising:
    a CPU which operates in a low power consumption mode when the computer is in the fuel cell assembly mode.

3. The computer according to claim 1, further comprising:
    an internal power source incorporated in the computer, wherein the internal power source is not used as a power source of the computer when the determining unit determines the power supply is from the fuel cell assembly.

4. The computer according to claim 1, wherein the setting unit sets the operation mode as the fuel cell assembly mode when the computer is in an OFF state.

5. The computer according to claim 1, further comprising:
    a displaying unit which displays a warning message when the computer is not in the fuel cell assembly mode.

6. The computer according to claim 2, wherein in the low power consumption mode, a clock speed of the CPU decreases.

7. The computer according to claim 1, further comprising:
    a predetermined application program which is not executed when the computer is in the fuel cell assembly mode.

8. The computer according to claim 7, wherein the predetermined application program is set by a user.

9. The computer according to claim 1, further comprising:

a predetermined peripheral device which is not activated when the computer is in the fuel cell assembly mode.

10. The computer according to claim 1, further comprising:

a body;

an AC-adapter connector provided with the body, the AC adapter connector being capable of receiving power from an AC-adapter and a fuel cell assembly.

11. The computer according to claim 10, further comprising a battery which is charged with the received power from the fuel cell assembly.

12. The computer according to claim 1, further comprising:

a body;

a first connector provided with the body, the first connector being capable of receiving power from an AC-adapter; and a second connector provided with the body, the second connector being capable of receiving power from a fuel cell assembly.

13. The computer according to claim 12, further comprising a battery which is charged with the power from the fuel cell assembly.

14. A method of activating of a computer, comprising:

determining whether a power supply is from a fuel cell assembly to the computer; and causing the computer to operate in a fuel cell assembly mode in which the power supply is from the fuel cell assembly, based on a determination that the power supply is from the fuel cell assembly.

15. The method according to claim 14, further comprising:

operating a CPU in a low power consumption mode when the computer is in the fuel cell assembly mode.

16. The method according to claim 14, further comprising:

inhibiting an execution of a predetermined application program when the computer is in the fuel cell assembly mode.

17. The method according to claim 14, further comprising:

inhibiting an activation of a predetermined peripheral device when the computer is in he fuel cell assembly mode.

18. A computer system, comprising:

a body;

a fuel cell assembly for supplying power to the body;

a determining unit which determines whether a power supply is from the fuel cell assembly; and a setting unit which sets an operation mode of the computer system as a fuel cell assembly mode in which the power supply is from the fuel cell assembly, when the determining unit determines the power supply is from the fuel cell assembly.

19. The computer system according to claim 18, further comprising:

a CPU which operates in a low power consumption mode when the computer is in the fuel cell assembly mode.

20. The computer system according to claim 18, further comprising:

a predetermined application program which is not executed when the computer is in the fuel cell assembly mode.

* * * * *

UNITED STATES PATENT AND TRADEMARK OFFICE
CERTIFICATE OF CORRECTION

PATENT NO.     : 6,910,138 B2
DATED          : June 21, 2005
INVENTOR(S)    : Hayashi et al.

It is certified that error appears in the above-identified patent and that said Letters Patent is hereby corrected as shown below:

Column 12,
Line 11, change "he fuel" to -- the fuel --.

Signed and Sealed this

Thirtieth Day of August, 2005

JON W. DUDAS
*Director of the United States Patent and Trademark Office*